(12) United States Patent
Raichelgauz

(10) Patent No.: US 11,643,005 B2
(45) Date of Patent: May 9, 2023

(54) ADJUSTING ADJUSTABLE HEADLIGHTS OF A VEHICLE

(71) Applicant: Cartica AI Ltd., Tel Aviv (IL)

(72) Inventor: Igal Raichelgauz, Tel Aviv (IL)

(73) Assignee: AUTOBRAINS TECHNOLOGIES LTD, Tel Aviv-Jaffa (IL)

( * ) Notice: Subject to any disclaimer, the term of this patent is extended or adjusted under 35 U.S.C. 154(b) by 0 days.

(21) Appl. No.: 16/795,590

(22) Filed: Feb. 20, 2020

(65) Prior Publication Data

US 2020/0269746 A1   Aug. 27, 2020

Related U.S. Application Data

(60) Provisional application No. 62/827,112, filed on Mar. 31, 2019, provisional application No. 62/811,134, filed on Feb. 27, 2019.

(51) Int. Cl.
| | |
|---|---|
| *B60Q 1/08* | (2006.01) |
| *B60Q 1/10* | (2006.01) |
| *F21S 41/60* | (2018.01) |

(52) U.S. Cl.
CPC ............... *B60Q 1/10* (2013.01); *F21S 41/60* (2018.01)

(58) Field of Classification Search
CPC ............................................... B60Q 1/08–124
See application file for complete search history.

(56) References Cited

U.S. PATENT DOCUMENTS

| | | |
|---|---|---|
| 4,733,353 A | 3/1988 | Jaswa |
| 4,932,645 A | 6/1990 | Schorey et al. |
| 4,972,363 A | 11/1990 | Nguyen et al. |
| 5,078,501 A | 1/1992 | Hekker et al. |
| 5,214,746 A | 5/1993 | Fogel et al. |

(Continued)

FOREIGN PATENT DOCUMENTS

| | | |
|---|---|---|
| EP | 1085464 A3 | 1/2007 |
| WO | 0231764 A2 | 4/2002 |

(Continued)

OTHER PUBLICATIONS

Jasinschi et al., A Probabilistic Layered Framework for Integrating Multimedia Content and Context Information, 2002, IEEE, p. 2057-2060. (Year: 2002).

(Continued)

*Primary Examiner* — Sean P Gramling
(74) *Attorney, Agent, or Firm* — Reches Patents

(57) ABSTRACT

A method for operating adjustable headlights of a vehicle, the method may include sensing, by a vehicle night-vision sensor, an environment of the vehicle to provide sensed information; searching, in the sensed information, for a headlight adjustment event identifier, the headlight adjustment event identifier identifies a future occurrence of a headlight adjustment event, the headlight adjustment event requires an adjustment of a lighting pattern formed by at least one of the adjustable highlights of the vehicle; and when finding the headlight adjustment event identifier then adjusting the lighting pattern according to the headlight adjustment event, wherein the adjusting begins before the future occurrence of the headlight adjustment event or immediately at a beginning of the headlight adjustment event.

22 Claims, 10 Drawing Sheets

(56) References Cited

U.S. PATENT DOCUMENTS

| | | |
|---|---|---|
| 5,307,451 A | 4/1994 | Clark |
| 5,412,564 A | 5/1995 | Ecer |
| 5,436,653 A | 7/1995 | Ellis et al. |
| 5,568,181 A | 10/1996 | Greenwood et al. |
| 5,638,425 A | 6/1997 | Meador, I et al. |
| 5,745,678 A | 4/1998 | Herzberg et al. |
| 5,754,938 A | 5/1998 | Herz et al. |
| 5,763,069 A | 6/1998 | Jordan |
| 5,806,061 A | 9/1998 | Chaudhuri et al. |
| 5,835,087 A | 11/1998 | Herz et al. |
| 5,835,901 A | 11/1998 | Duvoisin et al. |
| 5,852,435 A | 12/1998 | Vigneaux et al. |
| 5,870,754 A | 2/1999 | Dimitrova et al. |
| 5,873,080 A | 2/1999 | Coden et al. |
| 5,887,193 A | 3/1999 | Takahashi et al. |
| 5,926,812 A | 7/1999 | Hilsenrath et al. |
| 5,978,754 A | 11/1999 | Kumano |
| 5,991,306 A | 11/1999 | Burns et al. |
| 6,052,481 A | 4/2000 | Grajski et al. |
| 6,070,167 A | 5/2000 | Qian et al. |
| 6,076,088 A | 6/2000 | Paik et al. |
| 6,122,628 A | 9/2000 | Castelli et al. |
| 6,128,651 A | 10/2000 | Cezar |
| 6,137,911 A | 10/2000 | Zhilyaev |
| 6,144,767 A | 11/2000 | Bottou et al. |
| 6,147,636 A | 11/2000 | Gershenson |
| 6,163,510 A | 12/2000 | Lee et al. |
| 6,243,375 B1 | 6/2001 | Speicher |
| 6,243,713 B1 | 6/2001 | Nelson et al. |
| 6,275,599 B1 | 8/2001 | Adler et al. |
| 6,314,419 B1 | 11/2001 | Faisal |
| 6,329,986 B1 | 12/2001 | Cheng |
| 6,381,656 B1 | 4/2002 | Shankman |
| 6,411,229 B2 | 6/2002 | Kobayashi |
| 6,422,617 B1 | 7/2002 | Fukumoto et al. |
| 6,507,672 B1 | 1/2003 | Watkins et al. |
| 6,523,046 B2 | 2/2003 | Liu et al. |
| 6,524,861 B1 | 2/2003 | Anderson |
| 6,546,405 B2 | 4/2003 | Gupta et al. |
| 6,550,018 B1 | 4/2003 | Abonamah et al. |
| 6,557,042 B1 | 4/2003 | He et al. |
| 6,594,699 B1 | 7/2003 | Sahai et al. |
| 6,601,026 B2 | 7/2003 | Appelt et al. |
| 6,611,628 B1 | 8/2003 | Sekiguchi et al. |
| 6,618,711 B1 | 9/2003 | Ananth |
| 6,640,015 B1 | 10/2003 | Lafruit |
| 6,643,620 B1 | 11/2003 | Contolini et al. |
| 6,643,643 B1 | 11/2003 | Lee et al. |
| 6,665,657 B1 | 12/2003 | Dibachi |
| 6,681,032 B2 | 1/2004 | Bortolussi et al. |
| 6,704,725 B1 | 3/2004 | Lee |
| 6,732,149 B1 | 5/2004 | Kephart |
| 6,742,094 B2 | 5/2004 | Igari |
| 6,751,363 B1 | 6/2004 | Natsev et al. |
| 6,751,613 B1 | 6/2004 | Lee et al. |
| 6,754,435 B2 | 6/2004 | Kim |
| 6,763,069 B1 | 7/2004 | Divakaran et al. |
| 6,763,519 B1 | 7/2004 | McColl et al. |
| 6,774,917 B1 | 8/2004 | Foote et al. |
| 6,795,818 B1 | 9/2004 | Lee |
| 6,804,356 B1 | 10/2004 | Krishnamachari |
| 6,813,395 B1 | 11/2004 | Kinjo |
| 6,819,797 B1 | 11/2004 | Smith et al. |
| 6,877,134 B1 | 4/2005 | Fuller et al. |
| 6,901,207 B1 | 5/2005 | Watkins |
| 6,938,025 B1 | 8/2005 | Lulich et al. |
| 6,985,172 B1 | 1/2006 | Rigney et al. |
| 7,013,051 B2 | 3/2006 | Sekiguchi et al. |
| 7,020,654 B1 | 3/2006 | Najmi |
| 7,023,979 B1 | 4/2006 | Wu et al. |
| 7,043,473 B1 | 5/2006 | Rassool et al. |
| 7,158,681 B2 | 1/2007 | Persiantsev |
| 7,215,828 B2 | 5/2007 | Luo |
| 7,260,564 B1 | 8/2007 | Lynn et al. |
| 7,289,643 B2 | 10/2007 | Brunk et al. |
| 7,299,261 B1 | 11/2007 | Oliver et al. |
| 7,302,089 B1 | 11/2007 | Smits |
| 7,302,117 B2 | 11/2007 | Sekiguchi et al. |
| 7,313,805 B1 | 12/2007 | Rosin et al. |
| 7,340,358 B2 | 3/2008 | Yoneyama |
| 7,346,629 B2 | 3/2008 | Kapur et al. |
| 7,353,224 B2 | 4/2008 | Chen et al. |
| 7,376,672 B2 | 5/2008 | Weare |
| 7,383,179 B2 | 6/2008 | Alves et al. |
| 7,433,895 B2 | 10/2008 | Li et al. |
| 7,464,086 B2 | 12/2008 | Black et al. |
| 7,529,659 B2 | 5/2009 | Wold |
| 7,657,100 B2 | 2/2010 | Gokturk et al. |
| 7,660,468 B2 | 2/2010 | Gokturk et al. |
| 7,801,893 B2 | 9/2010 | Gulli |
| 7,805,446 B2 | 9/2010 | Potok et al. |
| 7,860,895 B1 | 12/2010 | Scofield et al. |
| 7,872,669 B2 | 1/2011 | Darrell et al. |
| 7,921,288 B1 | 4/2011 | Hildebrand |
| 7,933,407 B2 | 4/2011 | Keidar et al. |
| 8,023,739 B2 | 9/2011 | Hohimer et al. |
| 8,266,185 B2 | 9/2012 | Raichelgauz et al. |
| 8,275,764 B2 | 9/2012 | Jeon |
| 8,285,718 B1 | 10/2012 | Ong et al. |
| 8,312,031 B2 | 11/2012 | Raichelgauz et al. |
| 8,315,442 B2 | 11/2012 | Gokturk et al. |
| 8,345,982 B2 | 1/2013 | Gokturk et al. |
| 8,386,400 B2 | 2/2013 | Raichelgauz et al. |
| 8,396,876 B2 | 3/2013 | Kennedy et al. |
| 8,418,206 B2 | 4/2013 | Bryant et al. |
| RE44,225 E | 5/2013 | Aviv |
| 8,442,321 B1 | 5/2013 | Chang et al. |
| 8,457,827 B1 | 6/2013 | Ferguson et al. |
| 8,495,489 B1 | 7/2013 | Everingham |
| 8,527,978 B1 | 9/2013 | Sallam |
| 8,634,980 B1 | 1/2014 | Urmson |
| 8,635,531 B2 | 1/2014 | Graham et al. |
| 8,655,801 B2 | 2/2014 | Raichelgauz et al. |
| 8,655,878 B1 | 2/2014 | Kulkarni et al. |
| 8,781,152 B2 | 7/2014 | Momeyer |
| 8,782,077 B1 | 7/2014 | Rowley |
| 8,799,195 B2 | 8/2014 | Raichelgauz et al. |
| 8,799,196 B2 | 8/2014 | Raichelquaz et al. |
| 8,818,916 B2 | 8/2014 | Raichelgauz et al. |
| 8,868,861 B2 | 10/2014 | Shimizu et al. |
| 8,886,648 B1 | 11/2014 | Procopio et al. |
| 8,954,887 B1 | 2/2015 | Tseng et al. |
| 8,990,199 B1 | 3/2015 | Ramesh et al. |
| 9,009,086 B2 | 4/2015 | Raichelgauz et al. |
| 9,104,747 B2 | 8/2015 | Raichelgauz et al. |
| 9,165,406 B1 | 10/2015 | Gray et al. |
| 9,298,763 B1 | 3/2016 | Zack |
| 9,311,308 B2 | 4/2016 | Sankarasubramaniam et al. |
| 9,323,754 B2 | 4/2016 | Ramanathan et al. |
| 9,440,647 B1 | 9/2016 | Sucan |
| 9,466,068 B2 | 10/2016 | Raichelgauz et al. |
| 9,646,006 B2 | 5/2017 | Raichelgauz et al. |
| 9,679,062 B2 | 6/2017 | Schillings et al. |
| 9,734,533 B1 | 8/2017 | Givot |
| 9,807,442 B2 | 10/2017 | Bhatia et al. |
| 9,875,445 B2 | 1/2018 | Amer et al. |
| 9,984,369 B2 | 5/2018 | Li et al. |
| 10,133,947 B2 | 11/2018 | Yang |
| 10,347,122 B2 | 7/2019 | Takenaka |
| 10,491,885 B1 | 11/2019 | Hicks |
| 2001/0019633 A1 | 9/2001 | Tenze et al. |
| 2001/0034219 A1 | 10/2001 | Hewitt et al. |
| 2001/0038876 A1 | 11/2001 | Anderson |
| 2002/0004743 A1 | 1/2002 | Kutaragi et al. |
| 2002/0010682 A1 | 1/2002 | Johnson |
| 2002/0010715 A1 | 1/2002 | Chinn et al. |
| 2002/0019881 A1 | 2/2002 | Bokhari et al. |
| 2002/0032677 A1 | 3/2002 | Morgenthaler et al. |
| 2002/0038299 A1 | 3/2002 | Zernik et al. |
| 2002/0042914 A1 | 4/2002 | Walker et al. |
| 2002/0072935 A1 | 6/2002 | Rowse et al. |
| 2002/0087530 A1 | 7/2002 | Smith et al. |
| 2002/0087828 A1 | 7/2002 | Arimilli et al. |
| 2002/0091947 A1 | 7/2002 | Nakamura |

(56) References Cited

U.S. PATENT DOCUMENTS

| | | |
|---|---|---|
| 2002/0107827 A1 | 8/2002 | Benitez-Jimenez et al. |
| 2002/0113812 A1 | 8/2002 | Walker et al. |
| 2002/0126002 A1 | 9/2002 | Patchell |
| 2002/0126872 A1 | 9/2002 | Brunk et al. |
| 2002/0129140 A1 | 9/2002 | Peled et al. |
| 2002/0147637 A1 | 10/2002 | Kraft et al. |
| 2002/0157116 A1 | 10/2002 | Jasinschi |
| 2002/0163532 A1 | 11/2002 | Thomas et al. |
| 2002/0174095 A1 | 11/2002 | Lulich et al. |
| 2002/0184505 A1 | 12/2002 | Mihcak et al. |
| 2003/0004966 A1 | 1/2003 | Bolle et al. |
| 2003/0005432 A1 | 1/2003 | Ellis et al. |
| 2003/0037010 A1 | 2/2003 | Schmelzer |
| 2003/0041047 A1 | 2/2003 | Chang et al. |
| 2003/0089216 A1 | 5/2003 | Birmingham et al. |
| 2003/0093790 A1 | 5/2003 | Logan et al. |
| 2003/0101150 A1 | 5/2003 | Agnihotri et al. |
| 2003/0105739 A1 | 6/2003 | Essafi et al. |
| 2003/0110236 A1 | 6/2003 | Yang et al. |
| 2003/0115191 A1 | 6/2003 | Copperman et al. |
| 2003/0122704 A1* | 7/2003 | Dubrovin .................. 342/70 |
| 2003/0126147 A1 | 7/2003 | Essafi et al. |
| 2003/0140257 A1 | 7/2003 | Peterka et al. |
| 2003/0165269 A1 | 9/2003 | Fedorovskaya et al. |
| 2003/0174859 A1 | 9/2003 | Kim |
| 2003/0184598 A1 | 10/2003 | Graham |
| 2003/0200217 A1 | 10/2003 | Ackerman |
| 2003/0217335 A1 | 11/2003 | Chung et al. |
| 2003/0229531 A1 | 12/2003 | Heckerman et al. |
| 2004/0059736 A1 | 3/2004 | Willse |
| 2004/0091111 A1 | 5/2004 | Levy et al. |
| 2004/0095376 A1 | 5/2004 | Graham et al. |
| 2004/0098671 A1 | 5/2004 | Graham et al. |
| 2004/0111432 A1 | 6/2004 | Adams et al. |
| 2004/0117638 A1 | 6/2004 | Monroe |
| 2004/0128511 A1 | 7/2004 | Sun et al. |
| 2004/0153426 A1 | 8/2004 | Nugent |
| 2004/0162820 A1 | 8/2004 | James et al. |
| 2004/0230572 A1 | 11/2004 | Omoigui |
| 2004/0267774 A1 | 12/2004 | Lin et al. |
| 2005/0021394 A1 | 1/2005 | Miedema et al. |
| 2005/0080788 A1 | 4/2005 | Murata |
| 2005/0114198 A1 | 5/2005 | Koningstein et al. |
| 2005/0131884 A1 | 6/2005 | Gross et al. |
| 2005/0163375 A1 | 7/2005 | Grady |
| 2005/0172130 A1 | 8/2005 | Roberts |
| 2005/0177372 A1 | 8/2005 | Wang et al. |
| 2005/0193015 A1 | 9/2005 | Logston |
| 2005/0226511 A1 | 10/2005 | Short |
| 2005/0238198 A1 | 10/2005 | Brown et al. |
| 2005/0238238 A1 | 10/2005 | Xu et al. |
| 2005/0249398 A1 | 11/2005 | Khamene et al. |
| 2005/0256820 A1 | 11/2005 | Dugan et al. |
| 2005/0262428 A1 | 11/2005 | Little et al. |
| 2005/0281439 A1 | 12/2005 | Lange |
| 2005/0289163 A1 | 12/2005 | Gordon et al. |
| 2005/0289590 A1 | 12/2005 | Cheok et al. |
| 2006/0004745 A1 | 1/2006 | Kuhn et al. |
| 2006/0015580 A1 | 1/2006 | Gabriel et al. |
| 2006/0020958 A1 | 1/2006 | Allamanche et al. |
| 2006/0033163 A1 | 2/2006 | Chen |
| 2006/0050993 A1 | 3/2006 | Stentiford |
| 2006/0069668 A1 | 3/2006 | Braddy et al. |
| 2006/0080311 A1 | 4/2006 | Potok et al. |
| 2006/0100987 A1 | 5/2006 | Leurs |
| 2006/0112035 A1 | 5/2006 | Cecchi et al. |
| 2006/0120626 A1 | 6/2006 | Perlmutter |
| 2006/0129822 A1 | 6/2006 | Snijder et al. |
| 2006/0217818 A1 | 9/2006 | Fujiwara |
| 2006/0217828 A1 | 9/2006 | Hicken |
| 2006/0218191 A1 | 9/2006 | Gopalakrishnan |
| 2006/0224529 A1 | 10/2006 | Kermani |
| 2006/0236343 A1 | 10/2006 | Chang |
| 2006/0242130 A1 | 10/2006 | Sadri et al. |
| 2006/0248558 A1 | 11/2006 | Barton et al. |
| 2006/0251338 A1 | 11/2006 | Gokturk et al. |
| 2006/0251339 A1 | 11/2006 | Gokturk |
| 2006/0253423 A1 | 11/2006 | McLane et al. |
| 2006/0288002 A1 | 12/2006 | Epstein et al. |
| 2007/0022374 A1 | 1/2007 | Huang et al. |
| 2007/0033170 A1 | 2/2007 | Sull et al. |
| 2007/0038614 A1 | 2/2007 | Guha |
| 2007/0042757 A1 | 2/2007 | Jung et al. |
| 2007/0061302 A1 | 3/2007 | Ramer et al. |
| 2007/0067304 A1 | 3/2007 | Ives |
| 2007/0074147 A1 | 3/2007 | Wold |
| 2007/0083611 A1 | 4/2007 | Farago et al. |
| 2007/0091106 A1 | 4/2007 | Moroney |
| 2007/0130159 A1 | 6/2007 | Gulli et al. |
| 2007/0136782 A1 | 6/2007 | Ramaswamy et al. |
| 2007/0156720 A1 | 7/2007 | Maren |
| 2007/0196013 A1 | 8/2007 | Li |
| 2007/0244902 A1 | 10/2007 | Seide et al. |
| 2007/0253594 A1 | 11/2007 | Lu et al. |
| 2007/0298152 A1 | 12/2007 | Baets |
| 2008/0049789 A1 | 2/2008 | Vedantham et al. |
| 2008/0072256 A1 | 3/2008 | Boicey et al. |
| 2008/0079729 A1 | 4/2008 | Brailovsky |
| 2008/0109433 A1 | 5/2008 | Rose |
| 2008/0152231 A1 | 6/2008 | Gokturk |
| 2008/0159622 A1 | 7/2008 | Agnihotri et al. |
| 2008/0165861 A1 | 7/2008 | Wen et al. |
| 2008/0166020 A1 | 7/2008 | Kosaka |
| 2008/0201299 A1 | 8/2008 | Lehikoinen et al. |
| 2008/0201314 A1 | 8/2008 | Smith et al. |
| 2008/0201361 A1 | 8/2008 | Castro et al. |
| 2008/0228995 A1 | 9/2008 | Tan et al. |
| 2008/0237359 A1 | 10/2008 | Silverbrook et al. |
| 2008/0247543 A1 | 10/2008 | Mick et al. |
| 2008/0253737 A1 | 10/2008 | Kimura et al. |
| 2008/0263579 A1 | 10/2008 | Mears et al. |
| 2008/0270373 A1 | 10/2008 | Oostveen et al. |
| 2008/0270569 A1 | 10/2008 | McBride |
| 2008/0294278 A1 | 11/2008 | Borgeson et al. |
| 2008/0307454 A1 | 12/2008 | Ahanger et al. |
| 2008/0313140 A1 | 12/2008 | Pereira et al. |
| 2009/0022472 A1 | 1/2009 | Bronstein |
| 2009/0024641 A1 | 1/2009 | Quigley et al. |
| 2009/0034791 A1 | 2/2009 | Doretto |
| 2009/0037088 A1 | 2/2009 | Taguchi |
| 2009/0043637 A1 | 2/2009 | Eder |
| 2009/0043818 A1 | 2/2009 | Raichelgauz |
| 2009/0080759 A1 | 3/2009 | Bhaskar |
| 2009/0096634 A1 | 4/2009 | Emam et al. |
| 2009/0125544 A1 | 5/2009 | Brindley |
| 2009/0157575 A1 | 6/2009 | Schobben et al. |
| 2009/0165031 A1 | 6/2009 | Li et al. |
| 2009/0172030 A1 | 7/2009 | Schiff et al. |
| 2009/0208106 A1 | 8/2009 | Dunlop et al. |
| 2009/0208118 A1 | 8/2009 | Csurka |
| 2009/0216761 A1 | 8/2009 | Raichelgauz |
| 2009/0220138 A1 | 9/2009 | Zhang et al. |
| 2009/0245573 A1 | 10/2009 | Saptharishi et al. |
| 2009/0254572 A1 | 10/2009 | Redlich et al. |
| 2009/0278934 A1 | 11/2009 | Ecker |
| 2009/0282218 A1 | 11/2009 | Raichelgauz et al. |
| 2009/0297048 A1 | 12/2009 | Slotine et al. |
| 2010/0042646 A1 | 2/2010 | Raichelqauz |
| 2010/0082684 A1 | 4/2010 | Churchill |
| 2010/0104184 A1 | 4/2010 | Bronstein et al. |
| 2010/0111408 A1 | 5/2010 | Matsuhira |
| 2010/0125569 A1 | 5/2010 | Nair et al. |
| 2010/0162405 A1 | 6/2010 | Cook et al. |
| 2010/0191391 A1 | 7/2010 | Zeng |
| 2010/0198626 A1 | 8/2010 | Cho et al. |
| 2010/0212015 A1 | 8/2010 | Jin et al. |
| 2010/0284604 A1 | 11/2010 | Chrysanthakopoulos |
| 2010/0293057 A1 | 11/2010 | Haveliwala et al. |
| 2010/0306193 A1 | 12/2010 | Pereira |
| 2010/0312736 A1 | 12/2010 | Kello |
| 2010/0318493 A1 | 12/2010 | Wessling |
| 2010/0325138 A1 | 12/2010 | Lee et al. |
| 2010/0325581 A1 | 12/2010 | Finkelstein et al. |
| 2011/0029620 A1 | 2/2011 | Bonforte |

(56) References Cited

U.S. PATENT DOCUMENTS

| | | |
|---|---|---|
| 2011/0035373 A1 | 2/2011 | Berg et al. |
| 2011/0038545 A1 | 2/2011 | Bober |
| 2011/0055585 A1 | 3/2011 | Lee |
| 2011/0164180 A1 | 7/2011 | Lee |
| 2011/0164810 A1 | 7/2011 | Zang et al. |
| 2011/0216209 A1 | 9/2011 | Fredlund et al. |
| 2011/0218946 A1 | 9/2011 | Stern et al. |
| 2011/0246566 A1 | 10/2011 | Kashef |
| 2011/0276680 A1 | 11/2011 | Rimon |
| 2011/0296315 A1 | 12/2011 | Lin et al. |
| 2012/0131454 A1 | 5/2012 | Shah |
| 2012/0133497 A1 | 5/2012 | Sasaki |
| 2012/0136853 A1 | 5/2012 | Kennedy et al. |
| 2012/0167133 A1 | 6/2012 | Carroll et al. |
| 2012/0179642 A1 | 7/2012 | Sweeney et al. |
| 2012/0179751 A1 | 7/2012 | Ahn |
| 2012/0185445 A1 | 7/2012 | Borden et al. |
| 2012/0207346 A1 | 8/2012 | Kohli et al. |
| 2012/0221470 A1 | 8/2012 | Lyon |
| 2012/0227074 A1 | 9/2012 | Hill et al. |
| 2012/0239690 A1 | 9/2012 | Asikainen et al. |
| 2012/0239694 A1 | 9/2012 | Avner et al. |
| 2012/0265735 A1 | 10/2012 | McMillan et al. |
| 2012/0294514 A1 | 11/2012 | Saunders et al. |
| 2012/0299961 A1 | 11/2012 | Ramkumar et al. |
| 2012/0301105 A1 | 11/2012 | Rehg et al. |
| 2012/0331011 A1 | 12/2012 | Raichelgauz et al. |
| 2013/0043990 A1 | 2/2013 | Al-Jafar |
| 2013/0066856 A1 | 3/2013 | Ong et al. |
| 2013/0067364 A1 | 3/2013 | Berntson et al. |
| 2013/0086499 A1 | 4/2013 | Dyor et al. |
| 2013/0089248 A1 | 4/2013 | Remiszewski et al. |
| 2013/0103814 A1 | 4/2013 | Carrasco |
| 2013/0151522 A1 | 6/2013 | Aggarwal et al. |
| 2013/0159298 A1 | 6/2013 | Mason et al. |
| 2013/0212493 A1 | 8/2013 | Krishnamurthy |
| 2013/0226820 A1 | 8/2013 | Sedota, Jr. |
| 2013/0226930 A1 | 8/2013 | Amgren et al. |
| 2013/0227023 A1 | 8/2013 | Raichelgauz et al. |
| 2013/0283401 A1 | 10/2013 | Pabla et al. |
| 2013/0346412 A1 | 12/2013 | Raichelgauz et al. |
| 2014/0019264 A1 | 1/2014 | Wachman et al. |
| 2014/0025692 A1 | 1/2014 | Pappas |
| 2014/0059443 A1 | 2/2014 | Tabe |
| 2014/0095425 A1 | 4/2014 | Sipple |
| 2014/0111647 A1 | 4/2014 | Atsmon |
| 2014/0125703 A1 | 5/2014 | Roveta et al. |
| 2014/0147829 A1 | 5/2014 | Jerauld |
| 2014/0149918 A1 | 5/2014 | Asokan et al. |
| 2014/0152698 A1 | 6/2014 | Kim et al. |
| 2014/0156691 A1 | 6/2014 | Conwell |
| 2014/0169681 A1 | 6/2014 | Drake |
| 2014/0176604 A1 | 6/2014 | Venkitaraman et al. |
| 2014/0193077 A1 | 7/2014 | Shiiyama et al. |
| 2014/0198986 A1 | 7/2014 | Marchesotti |
| 2014/0201330 A1 | 7/2014 | Lozano Lopez |
| 2014/0250032 A1 | 9/2014 | Huang et al. |
| 2014/0282655 A1 | 9/2014 | Roberts |
| 2014/0300722 A1 | 10/2014 | Garcia |
| 2014/0330830 A1 | 11/2014 | Raichelgauz et al. |
| 2014/0341476 A1 | 11/2014 | Kulick et al. |
| 2014/0363044 A1 | 12/2014 | Williams et al. |
| 2014/0379477 A1 | 12/2014 | Sheinfeld |
| 2015/0033150 A1 | 1/2015 | Lee |
| 2015/0052089 A1 | 2/2015 | Kozloski et al. |
| 2015/0100562 A1 | 4/2015 | Kohlmeier et al. |
| 2015/0117784 A1 | 4/2015 | Lin |
| 2015/0120627 A1 | 4/2015 | Hunzinger et al. |
| 2015/0127516 A1 | 5/2015 | Studnitzer et al. |
| 2015/0134688 A1 | 5/2015 | Jing |
| 2015/0248586 A1 | 9/2015 | Gaidon et al. |
| 2015/0254344 A1 | 9/2015 | Kulkarni et al. |
| 2015/0286742 A1 | 10/2015 | Zhang et al. |
| 2015/0286872 A1 | 10/2015 | Medioni et al. |
| 2015/0324356 A1 | 11/2015 | Gutierrez et al. |
| 2015/0332588 A1 | 11/2015 | Bulan et al. |
| 2015/0363644 A1 | 12/2015 | Wnuk |
| 2016/0007083 A1 | 1/2016 | Gurha |
| 2016/0026707 A1 | 1/2016 | Ong et al. |
| 2016/0132194 A1 | 5/2016 | Grue et al. |
| 2016/0210525 A1 | 7/2016 | Yang |
| 2016/0221592 A1 | 8/2016 | Puttagunta |
| 2016/0275766 A1 | 9/2016 | Venetianer et al. |
| 2016/0306798 A1 | 10/2016 | Guo et al. |
| 2016/0342683 A1 | 11/2016 | Kwon |
| 2016/0357188 A1 | 12/2016 | Ansari |
| 2016/0377251 A1* | 12/2016 | Kim ................ B60Q 1/14 362/466 |
| 2017/0017638 A1 | 1/2017 | Satyavarta et al. |
| 2017/0032257 A1 | 2/2017 | Sharifi |
| 2017/0041254 A1 | 2/2017 | Agara Venkatesha Rao |
| 2017/0109602 A1 | 4/2017 | Kim |
| 2017/0154241 A1 | 6/2017 | Shambik et al. |
| 2017/0255620 A1 | 9/2017 | Raichelgauz |
| 2017/0262437 A1 | 9/2017 | Raichelgauz |
| 2017/0323568 A1 | 11/2017 | Inoue |
| 2018/0081368 A1 | 3/2018 | Watanabe |
| 2018/0101177 A1 | 4/2018 | Cohen |
| 2018/0108258 A1 | 4/2018 | Dilger |
| 2018/0157903 A1 | 6/2018 | Tu et al. |
| 2018/0157916 A1 | 6/2018 | Doumbouya |
| 2018/0158323 A1 | 6/2018 | Takenaka |
| 2018/0189613 A1 | 7/2018 | Wolf et al. |
| 2018/0204111 A1 | 7/2018 | Zadeh |
| 2018/0373929 A1 | 12/2018 | Ye |
| 2019/0005726 A1 | 1/2019 | Nakano |
| 2019/0039627 A1 | 2/2019 | Yamamoto |
| 2019/0043274 A1 | 2/2019 | Hayakawa |
| 2019/0045244 A1 | 2/2019 | Balakrishnan |
| 2019/0056718 A1 | 2/2019 | Satou |
| 2019/0065951 A1 | 2/2019 | Luo |
| 2019/0096135 A1 | 3/2019 | Mutto et al. |
| 2019/0171912 A1 | 6/2019 | Vallespi-Gonzalez et al. |
| 2019/0188501 A1 | 6/2019 | Ryu |
| 2019/0220011 A1 | 7/2019 | Della Penna |
| 2019/0279046 A1 | 9/2019 | Han et al. |
| 2019/0304102 A1 | 10/2019 | Chen et al. |
| 2019/0317513 A1 | 10/2019 | Zhang |
| 2019/0364492 A1 | 11/2019 | Azizi |
| 2019/0384303 A1 | 12/2019 | Muller |
| 2019/0384312 A1 | 12/2019 | Herbach |
| 2019/0385460 A1 | 12/2019 | Magzimof |
| 2019/0389459 A1 | 12/2019 | Berntorp |
| 2020/0004248 A1 | 1/2020 | Healey |
| 2020/0004251 A1 | 1/2020 | Zhu |
| 2020/0004265 A1 | 1/2020 | Zhu |
| 2020/0005631 A1 | 1/2020 | Visintainer et al. |
| 2020/0018606 A1 | 1/2020 | Wolcott |
| 2020/0018618 A1 | 1/2020 | Ozog |
| 2020/0020212 A1 | 1/2020 | Song |
| 2020/0050973 A1 | 2/2020 | Stenneth |
| 2020/0073977 A1 | 3/2020 | Montemerlo |
| 2020/0090484 A1 | 3/2020 | Chen |
| 2020/0097756 A1 | 3/2020 | Hashimoto |
| 2020/0133307 A1 | 4/2020 | Kelkar |
| 2020/0043326 A1 | 6/2020 | Tao |

FOREIGN PATENT DOCUMENTS

| | | |
|---|---|---|
| WO | 2003067467 A1 | 8/2003 |
| WO | 2005027457 A1 | 3/2005 |
| WO | 2007049282 A2 | 5/2007 |
| WO | 2014076002 A1 | 5/2014 |
| WO | 2014137337 A1 | 9/2014 |
| WO | 2016040376 A1 | 3/2016 |
| WO | 2016070193 A1 | 5/2016 |

OTHER PUBLICATIONS

Jones et al., "Contextual Dynamics of Group-Based Sharing Decisions", 2011, University of Bath, p. 1777-1786. (Year: 2011).

Iwamoto, "Image Signature Robust to Caption Superimpostion for Video Sequence Identification", IEEE, pp. 3185-3188 (Year: 2006).

(56) References Cited

OTHER PUBLICATIONS

Cooperative Multi-Scale Convolutional Neural, Networks for Person Detection, Markus Eisenbach, Daniel Seichter, Tim Wengefeld, and Horst-Michael Gross Ilmenau University of Technology, Neuroinformatics and Cognitive Robotics Lab (Year; 2016).

Chen, Yixin, James Ze Wang, and Robert Krovetz. "CLUE: cluster-based retrieval of images by unsupervised learning." IEEE transactions on Image Processing 14.8 (2005); 1187-1201. (Year: 2005).

Wusk et al (Non-Invasive detection of Respiration and Heart Rate with a Vehicle Seat Sensor; www.mdpi.com/journal/sensors; Published: May 8, 2018). (Year: 2018).

Chen, Tiffany Yu-Han, et al. "Glimpse: Continuous, real-time object recognition on mobile devices." Proceedings of the 13th ACM Confrecene on Embedded Networked Sensor Systems. 2015. (Year: 2015).

"Computer Vision Demonstration Website", Electronics and Computer Science, University of Southampton, 2005, USA.

Big Bang Theory Series 04 Episode 12, aired Jan. 6, 2011; [retrieved from Internet: ].

Boari et al, "Adaptive Routing for Dynamic Applications in Massively Parallel Architectures", 1995 IEEE, Spring 1995, pp. 1-14.

Burgsteiner et al., "Movement Prediction from Real-World Images Using a Liquid State machine", Innovations in Applied Artificial Intelligence Lecture Notes in Computer Science, Lecture Notes in Artificial Intelligence, LNCS, Springer-Verlag, BE, vol. 3533, Jun. 2005, pp. 121-130.

Cernansky et al, "Feed-forward Echo State Networks", Proceedings of International Joint Conference on Neural Networks, Montreal, Canada, Jul. 31-Aug. 4, 2005, pp. 1-4.

Chinchor, Nancy A. et al.; Multimedia Analysis + Visual Analytics = Multimedia Analytics; IEEE Computer Society; 2010; pp. 52-60. (Year: 2010).

Fathy et al, "A Parallel Design and Implementation for Backpropagation Neural Network Using MIMD Architecture", 8th Mediterranean Electrotechnical Conference, 19'96. MELECON '96, Date of Conference: May 13-16, 1996, vol. 3 pp. 1472-1475, vol. 3.

Freisleben et al, "Recognition of Fractal Images Using a Neural Network", Lecture Notes in Computer Science, 1993, vol. 6861,1993, pp. 631-637.

Garcia, "Solving the Weighted Region Least Cost Path Problem Using Transputers", Naval Postgraduate School, Monterey, California, Dec. 1989.

Guo et al, AdOn: An Intelligent Overiay Video Advertising System (Year: 2009).

Hogue, "Tree Pattern Inference and Matching for Wrapper Induction on the World Wide Web", Master's Thesis, Massachusetts Institute of Technology, Jun. 2004, pp. 1-106.

Howlett et al, "A Multi-Computer Neural Network Architecture in a Virtual Sensor System Application", International journal of knowledge-based intelligent engineering systems, 4 (2). pp. 86-93, 133N 1327-2314.

Hua et al., "Robust Video Signature Based on Ordinal Measure", Image Processing, 2004, 2004 International Conference on Image Processing (ICIP), vol. 1, IEEE, pp. 685-688, 2004.

International Search Report and Written Opinion for PCT/US2016/050471, ISA/RU, Moscow, RU, dated May 4, 2017.

International Search Report and Written Opinion for PCT/US2016/054634, ISA/RU, Moscow, RU, dated Mar. 16, 2017.

International Search Report and Written Opinion for PCT/US2017/015831, ISA/RU, Moscow, RU, dated Apr. 20, 2017.

Johnson et al, "Pulse-Coupled Neural Nets: Translation, Rotation, Scale, Distortion, and Intensity Signal Invariance for Images", Applied Optics, vol. 33, No. 26,1994, pp. 6239-6253.

Lau et al., "Semantic Web Service Adaptation Model for a Pervasive Learning Scenario", 2008 IEEE Conference on Innovative Technologies in Intelligent Systems and Industrial Applications, 2008, pp. 98-103.

Li et al ("Matching Commercial Clips from TV Streams Using a Unique, Robust and Compact Signature" 2005) (Year: 2005).

Lin et al., "Generating robust digital signature for image/video authentication", Multimedia and Security Workshop at ACM Multimedia '98, Bristol, U.K., Sep. 1998, pp. 245-251.

Lu et al, "Structural Digital Signature for Image Authentication: An Incidental Distortion Resistant Scheme", IEEE Transactions on Multimedia, vol. 5, No. 2, Jun. 2003, pp. 161-173.

Lyon, "Computational Models of Neural Auditory Processing", IEEE International Conference on Acoustics, Speech, and Signal Processing, ICASSP '84, Date of Conference: Mar. 1984, vol. 9, pp. 41-44.

Ma Et El "Semantics modeling based image retrieval system using neural networks", 2005.

Marian Stewart B et al., "Independent component representations for face recognition", Proceedings of the SPIE Symposium on Electronic Imaging: Science and Technology; Conference on Human Vision and Electronic Imaging III, San Jose, California, Jan. 1998, pp. 1-12.

May et al, "The Transputer", Springer-Verlag Berlin Heidelberg 1989, vol. 41.

McNamara et al., "Diversity Decay in opportunistic Content Sharing Systems", 2011 IEEE International Symposium on a World of Wireless, Mobile and Multimedia Networks, pp. 1-3.

Morad et al., "Performance, Power Efficiency and Scalability of Asymmetric Cluster Chip Multiprocessors", Computer Architecture Letters, vol. 4, Jul. 4, 2005, pp. 1-4, XP002466254.

Nagy et al, "A Transputer, Based, Flexible, Real-Time Control System for Robotic Manipulators", UKACC International Conference on Control '96, Sep. 2-5, 1996, Conference Publication No. 427, IEE 1996.

Natschlager et al., "The "Liquid Computer": A novel strategy for real-time computing on time series", Special Issue on Foundations of Information Processing of telematik, vol. 8, No. 1, 2002, pp. 39-43, XP002466253.

Odinaev et al, "Cliques in Neural Ensembles as Perception Carriers", Technion—Institute of Technology, 2006 International Joint Conference on neural Networks, Canada, 2006, pp. 285-292.

Ortiz-Boyer et al, "CIXL2: A Crossover Operator for Evolutionary Algorithms Based on Population Features", Journal of Artificial Intelligence Research 24 (2005) Submitted Nov. 2004; published Jul. 2005, pp. 1-48.

Pandya etal. A Survey on QR Codes: in context of Research and Application. International Journal of Emerging Technology and U Advanced Engineering. ISSN 2250-2459, ISO 9001:2008 Certified Journal, vol. 4, Issue 3, Mar. 2014 (Year: 2014).

Queluz, "Content-Based Integrity Protection of Digital Images", SPIE Conf. on Security and Watermarking of Multimedia Contents, San Jose, Jan. 1999, pp. 85-93.

Rui, Yong et al. "Relevance feedback: a power tool for interactive content-based image retrieval." IEEE Transactions on circuits and systems for video technology 8 5 (1998): 644-655.

Santos et al., "SCORM-MPEG: an Ontology of Interoperable Metadata for multimediaand E-Learning", 23rd International Conference on Software, Telecommunications and Computer Networks (SoftCom), 2015, pp. 224-228.

Scheper et al, "Nonlinear dynamics in neural computation", ESANN'2006 proceedings—European Symposium on Artificial Neural Networks, Bruges (Belgium), Apr. 26-28, 2006, d-side publication, ISBN 2-930307-06-4, pp. 1-12.

Schneider et al, "A Robust Content based Digital Signature for Image Authentication", Proc. ICIP 1996, Lausane, Switzerland, Oct. 1996, pp. 227-230.

Srihari et al., "Intelligent Indexing and Semantic Retrieval of Multimodal Documents", Kluwer Academic Publishers, May 2000, vol. 2, Issue 2-3, pp. 245-275.

Srihari, Rohini K. "Automatic indexing and content-based retrieval of captioned images" Computer 0 (1995): 49-56.

Stolberg et al ("HIBRID-SOC: A Multi-Core SOC Architecture for Multimedia Signal Processing" 2003).

Stolberg et al, "HIBRID-SOC: A Mul Ti-Core SOC Architecture for Mul Timedia Signal Processing", 2003 IEEE, pp. 189-194.

(56) References Cited

OTHER PUBLICATIONS

Theodoropoulos et al, "Simulating Asynchronous Architectures on Transputer Networks", Proceedings of the Fourth Euromicro Workshop on Parallel and Distributed Processing, 1996. PDP '96, pp. 274-281.

Vallet et al ("Personalized Content Retrieval in Context Using Ontological Knowledge" Mar. 2007) (Year: 2007).

Verstraeten et al, "Isolated word recognition with the Liquid State Machine: a case study", Department of Electronics and Information Systems, Ghent University, Sint-Pietersnieuwstraat 41, 9000 Gent, Belgium, Available onlline Jul. 14, 2005, pp. 521-528.

Wang et al., "Classifying Objectionable Websites Based onImage Content", Stanford University, pp. 1-12.

Ware et al, "Locating and Identifying Components in a Robot's Workspace using a Hybrid Computer Architecture" Proceedings of the 1995 IEEE International Symposium on Intelligent Control, Aug. 27-29, 1995, pp. 139-144.

Whitby-Strevens, "The transputer", 1985 IEEE, pp. 292-300.

Wilk et al., "The Potential of Social-Aware Multimedia Prefetching on Mobile Devices", International Conference and Workshops on networked Systems (NetSys), 2015, pp. 1-5.

Yanagawa et al, "Columbia University's Baseline Detectors for 374 LSCOM Semantic Visual Concepts", Columbia University ADVENT Technical Report # 222-2006-8, Mar. 20, 2007, pp. 1-17.

Yanagawa et al., "Columbia University's Baseline Detectors for 374 LSCOM Semantic Visual Concepts", Columbia University ADVENT Technical Report #222, 2007, pp. 2006-2008.

Zhou et al, "Ensembling neural networks: Many could be better than all", National Laboratory for Novel Software Technology, Nanjing University, Hankou Road 22, Nanjing 210093, PR China, Available online Mar. 12, 2002, pp. 239-263.

Zhou et al., "Medical Diagnosis With C4.5 Rule Preceded by Artificial Neural Network Ensemble", IEEE Transactions on Information Technology in Biomedicine, vol. 7, Issue: 1, Mar. 2003, pp. 37-42.

Zhu et al., "Technology-Assisted Dietary Assesment", Proc SPIE. Mar. 20, 2008, pp. 1-15.

Zou et al., "A Content-Based Image Authentication System with Lossless Data Hiding", ICME 2003, pp. 213-216.

\* cited by examiner

102

ADJUSTING ADJUSTABLE HEADLIGHTS OF A VEHICLE

CROSS-REFERENCE

This application claims priority from U.S. provisional patent 62/811,134 filing date Feb. 27, 2019 and from US provisional patent 62/827,112 filing date Mar. 31, 2019 both incorporated herein by reference.

BACKGROUND

In low light conditions, mechanical sensors (accelerometer g-sensors) may sense that a vehicle entered a curve and may adjust the direction of lighting of headlights of the vehicle to point to a direction that is not straight ahead of the vehicle.

In the low light condition, the mechanical sensors may sense that the vehicle climbs a hill and may lower the direction of lighting.

The mechanical sensors may sense that the vehicle enters a curve and/or climbs a hill at a certain delay after actually entering the curve and after climbing the hill. The delay may result from the response period of the mechanical sensors as well from the need to distinguish between a curve and small turns of the wheel and/or minor maneuvers of the vehicle.

In some cases the certain delay may cause the driver to miss various obstacles that appear immediately after the beginning of the curve. Additionally or alternatively, the certain delay may reduce the response period of the driver in a manner that does not enable the driver to response to obstacles that appear after the beginning of the curve.

There is a growing need to provide an efficient method for adjusting adjustable lights.

SUMMARY

There may be provided a method for operating adjustable headlights of a vehicle, the method may include sensing, by a vehicle night-vision sensor, an environment of the vehicle to provide sensed information; searching, in the sensed information, for a headlight adjustment event identifier, the headlight adjustment event identifier identifies a future occurrence of a headlight adjustment event, the headlight adjustment event requires an adjustment of a lighting pattern formed by at least one of the adjustable highlights of the vehicle; and when finding the headlight adjustment event identifier then adjusting the lighting pattern according to the headlight adjustment event, wherein the adjusting begins before the future occurrence of the headlight adjustment event or immediately at a beginning of the headlight adjustment event.

The method may include receiving or generating different headlight adjustment event identifiers for identifying different headlight adjustment events.

The method may include receiving or generating a mapping between different headlight adjustment event identifiers and lighting patterns associated with the different headlight adjustment events.

The headlight adjustment event may be a curve.

The headlight adjustment event may be a change in an inclination of the road.

The headlight adjustment event may be a presence of an obstacle, a presence of an entity that may be expected to cross a path of the vehicle, a presence of an entity located at the side of the road (such as an animal that may cross the road).

The method may include sensing, by a visible light sensor, the environment of the vehicle to provide additional sensed information; searching, in the additional sensed information, for a headlight adjustment event identifier, the headlight adjustment event identifier identifies a future occurrence of a headlight adjustment event, the headlight adjustment event requires an adjustment of the lighting pattern formed by at least one of the adjustable highlights of the vehicle; when finding the headlight adjustment event identifier then adjusting the lighting pattern according to the headlight adjustment event, wherein the adjusting begins before the future occurrence of the headlight adjustment event or immediately at a beginning of the headlight adjustment event.

The adjusting of the lighting pattern may be also based on information sensed by another sensor of the vehicle.

The vehicle night-vision sensor may be a radar.

The vehicle night-vision sensor may be a LIDAR.

The vehicle night-vision sensor may be an infrared sensor.

A non-transitory computer readable medium for operating adjustable headlights of a vehicle, the non-transitory computer readable medium that may store instructions for sensing, by a vehicle night-vision sensor, an environment of the vehicle to provide sensed information; searching, in the sensed information, for a headlight adjustment event identifier, the headlight adjustment event identifier identifies a future occurrence of a headlight adjustment event, the headlight adjustment event requires an adjustment of a lighting pattern formed by at least one of the adjustable highlights of the vehicle; and when finding the headlight adjustment event identifier then adjusting the lighting pattern according to the headlight adjustment event, wherein the adjusting begins before the future occurrence of the headlight adjustment event or immediately at a beginning of the headlight adjustment event.

The non-transitory computer readable medium may store instructions for receiving or generating different headlight adjustment event identifiers for identifying different headlight adjustment events.

The non-transitory computer readable medium may store instructions for receiving or generating a mapping between different headlight adjustment event identifiers and lighting patterns associated with the different headlight adjustment events.

The headlight adjustment event may be a curve.

The headlight adjustment event may be a change in an inclination of the road.

The headlight adjustment event may be an entity that may be expected to cross a path of the vehicle.

The non-transitory computer readable medium may store instructions for sensing, by a visible light sensor, the environment of the vehicle to provide additional sensed information; searching, in the additional sensed information, for a headlight adjustment event identifier, the headlight adjustment event identifier identifies a future occurrence of a headlight adjustment event, the headlight adjustment event requires an adjustment of the lighting pattern formed by at least one of the adjustable highlights of the vehicle; when finding the headlight adjustment event identifier then adjusting the lighting pattern according to the headlight adjustment event, wherein the adjusting begins before the future occurrence of the headlight adjustment event or immediately at a beginning of the headlight adjustment event.

The adjusting of the lighting pattern may be also based on information sensed by another sensor of the vehicle.

BRIEF DESCRIPTION OF THE DRAWINGS

The embodiments of the disclosure will be understood and appreciated more fully from the following detailed description, taken in conjunction with the drawings in which.

DETAILED DESCRIPTION OF THE DRAWINGS

Any reference to a system or system should be applied, mutatis mutandis to a method that is executed by a system or system and/or to a non-transitory computer readable medium that stores instructions that once executed by the system or system will cause the system or system to execute the method.

Any reference to method should be applied, mutatis mutandis to a system or system that is configured to execute the method and/or to a non-transitory computer readable medium that stores instructions that once executed by the system or system will cause the system or system to execute the method.

Any reference to a non-transitory computer readable medium should be applied, mutatis mutandis to a method that is executed by a system or system and/or a system or system that is configured to execute the instructions stored in the non-transitory computer readable medium.

The term "and/or" is additionally or alternatively.

The term "night-vision sensor" is a sensor that is configured to sense scenes even at very low ambient conditions—and even at totally dark environments. Non-limiting examples of night-vision sensors include radars, LIDARs, infrared sensors, thermal sensor, and the like.

The term "visible light sensor" is sensor capable of sensing visible light that differs from the night-vision sensor.

The term "vehicle night-vision sensor" is a night-vision sensor that is installed in a vehicle and/or is connected to the vehicle.

The term "headlight adjustment event" is an event that requires an adjustment of a lighting pattern formed by at least one of the adjustable highlights of a vehicle.

The term "headlight adjustment event identifier" is an identifier that identifies a future occurrence of a headlight adjustment event. Accordingly—the identifier enable the vehicle to identify the headlight adjustment event before the headlight adjustment event occurs—thereby increasing the response period of the driver to any obstacle or other development that may be related to the occurrence of the event—for example any obstacle that is located after the beginning of the headlight adjustment event, any entity that may not be seen (initially) by the driver—but may cross the path of the vehicle, and the like.

Figure 1:
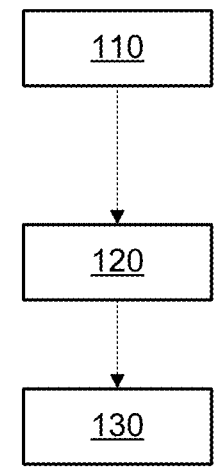
FIG. 1 is an example of a method.
Figure 2:
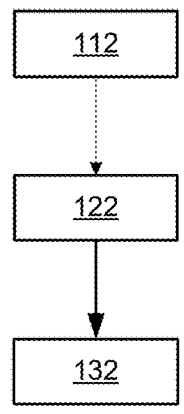
FIG. 2 is an example of a method.
Figure 2:
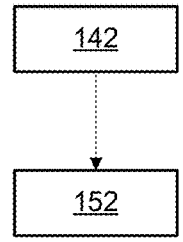

FIG. 1 illustrates a method 10.

Method 10 may start by step 12 of sensing, by a vehicle night-vision sensor, an environment of the vehicle to provide sensed information.

The vehicle night-vision sensor may be operated continuously, non-continuously, at certain time windows (for example—during the night), be activated based on ambient light conditions (for example—when the ambient light is below a threshold), under the control of a human driver, under the control of an automatic driving system, and the like.

The vehicle may include one or more vehicle night-vision sensors and may include additional sensors such as one or more visible light sensors, accelerometers, velocity sensors, shock sensors, telemetric sensors, and the like.

Step 12 may be followed by step 14 of searching, in the sensed information, for a headlight adjustment event identifier.

The vehicle may receive or generate different headlight adjustment event identifiers for identifying different headlight adjustment events such as a future curve, a future change in an inclination of a road, and the like.

The headlight adjustment event identifiers may include any combination of pixels, patches of image or any other signatures that once sensed by the night-vision sensor indicate of the future occurrence of the headlight adjustment event.

The vehicle may receive or generate a mapping between different headlight adjustment event identifiers and lighting patterns associated with the different headlight adjustment events.

The different headlight adjustment event identifiers may be learnt using object recognition, machine learning or any other image processing technique. It should be noted that sensed information from one or more other vehicle sensors nay be sued to verify the occurrence of the headlight adjustment event. For example—an accelerator may verify that the vehicle drove over a curve.

When finding the headlight adjustment event identifier then step 14 may be followed by step 16 of adjusting the lighting pattern according to the headlight adjustment event.

The adjusting may begin before the future occurrence of the headlight adjustment event.

The adjusting may begin immediately at a beginning of the headlight adjustment event. Immediately may include within a microsecond or millisecond range. Immediately may include within a period that is shorter than the certain delay introduced by detecting the occurrence of the events using physical sensors such as accelerometers.

The adjustment of the lighting pattern may include adjusting at least one out of (a) a direction of illumination, (b) an intensity of the illumination and (c) a shape of the lighting pattern.

It should be noted that the sensing of the future occurrence of the headlight adjustment event may also be based on the input from one or more other sensor of the vehicle—such as a visible light sensor.

Thus—method 10 may also include step 22 of sensing, by a visible light sensor, the environment of the vehicle to provide additional sensed information.

Step 22 may be followed by step 24 of searching, in the additional sensed information, for a headlight adjustment event identifier.

When finding the headlight adjustment event identifier then step 24 may be followed by step 26 of adjusting the lighting pattern according to the headlight adjustment event. The adjusting begins before the future occurrence of the headlight adjustment event or immediately at a beginning of the headlight adjustment event.

For example—the headlight adjustment event may be an object that may be still or may move towards the vehicle or may perform any movement that may place the object within an area that may affect the vehicle. For example—the event may be a vehicle that illuminates its vicinity with its own headlights.

Yet for another example—the night vision sensor and/or the visible light sensor may sense the lights of another vehicle that drives towards the vehicle—which may be defined as a headlight adjustment.

If, for example a curve is properly illuminated by night and/or road signs indicative of the curve are properly illuminated by night then the curve may be identifies by both night vision sensor and visible light sensor—and may be regarded as a headlight adjustment event.

It should be noted that events that should be recognized by both night vision sensor and visible light sensor may be used to verify each other.

Furthermore, the method may include storing information about the location of expected headlight adjustment events—(for example the location of the curve). Detecting the headlight adjustment event at the expected location further verifies the detection. A lack of detection may trigger an alert or otherwise require to check the sensor that did not detect the expected event.

FIGS. 3, 4, 5, 6 and 7 illustrate various scenarios that represent occurrences of headlight adjustable events.

Figure 3:
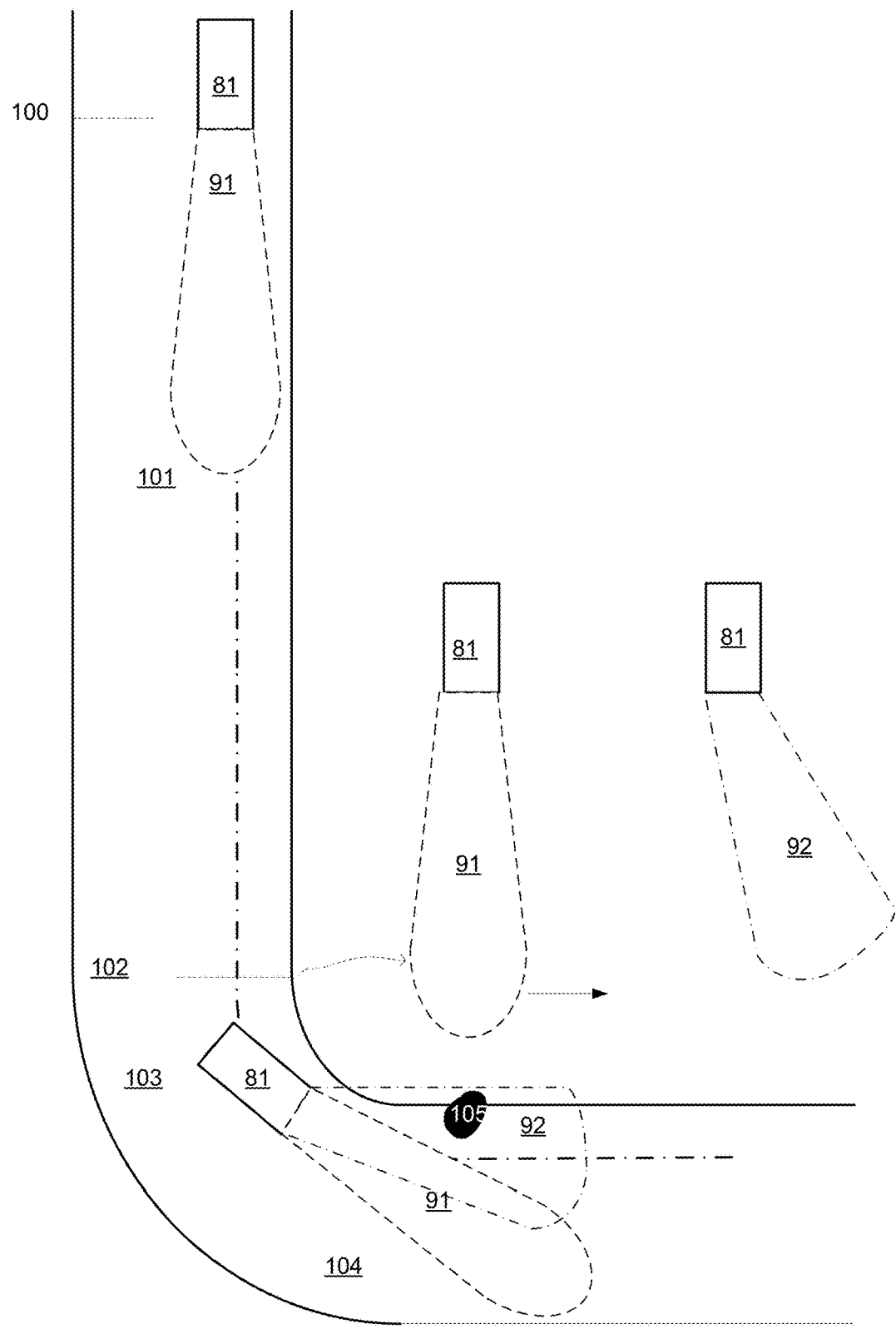
FIG. 3 is an example of a scenario.

FIG. 3 illustrates vehicle 81 that drives over a straight road segment 101 while applying a first lighting pattern 91. Vehicle 81 detect a left curve 103 well before reaching the curve and determines to adjust the current lighting pattern to an amended lighting pattern 92 either before reaching left curve 103 (for example few meters or few centimeters before reaching the curve) or immediately when the curve starts (at point 102)—and applies the adjustment accordingly. Vehicle 81 may switch back to first lighting pattern either before the left curve ends or immediately when the curve ends. The amended lighting pattern 92 allows the driver/vehicle to notice obstacle 105.

Figure 4:
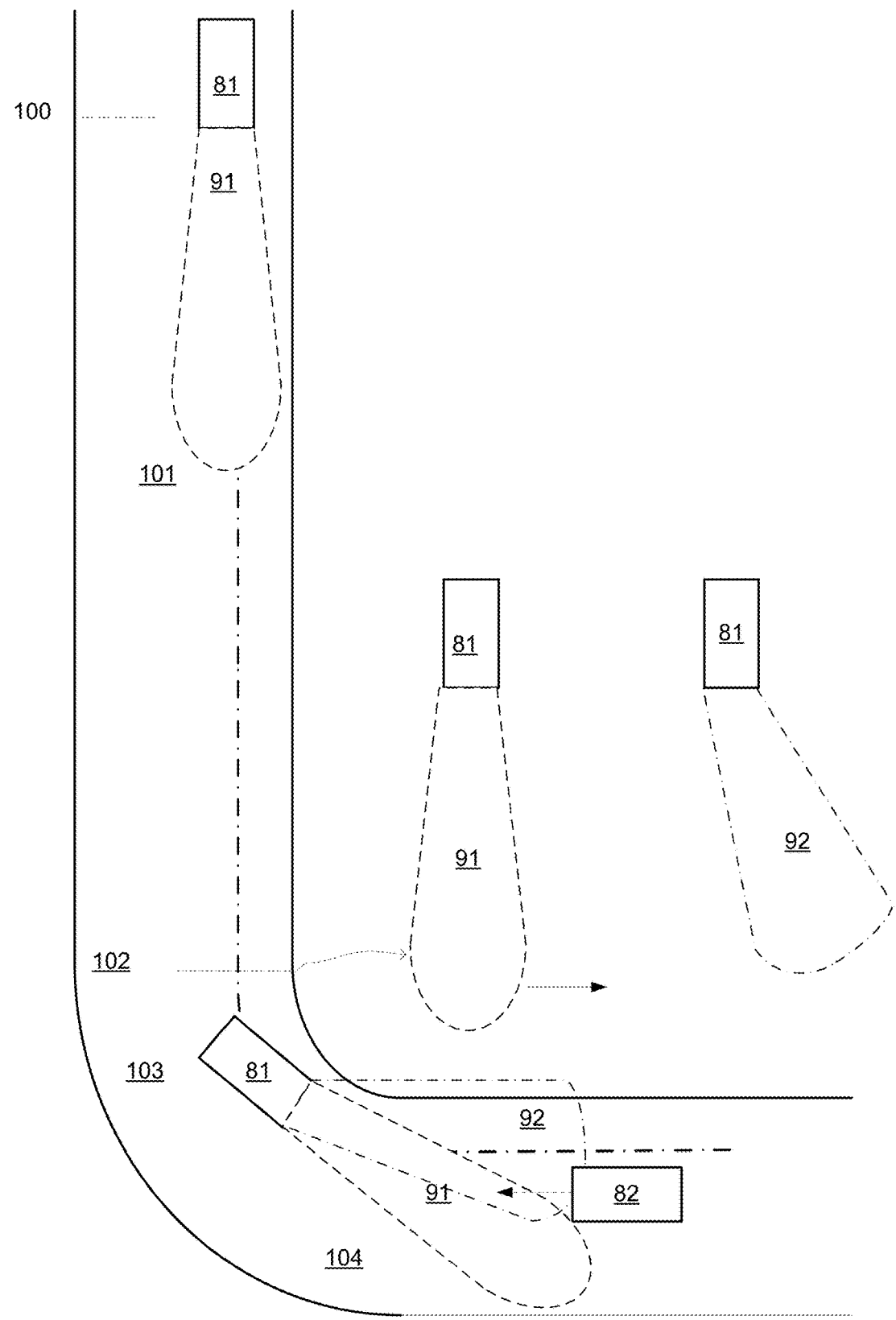
FIG. 4 is an example of a scenario.

FIG. 4 illustrates vehicle 81 that drives over a straight road segment 101 while applying a first lighting pattern 91. Vehicle 81 detect a left curve 103 well before reaching the curve and determines to adjust the current lighting pattern to an amended lighting pattern 92 either before reaching left curve 103 (for example few meters or few centimeters before reaching the curve) or immediately when the curve starts (at point 102)—and applies the adjustment accordingly. Vehicle 81 may switch back to first lighting pattern either before the left curve ends or immediately when the curve ends. The amended lighting pattern 92 allows the driver/vehicle to notice another vehicle 82 that is about to collide with vehicle 81 within the left curve.

Figure 5:
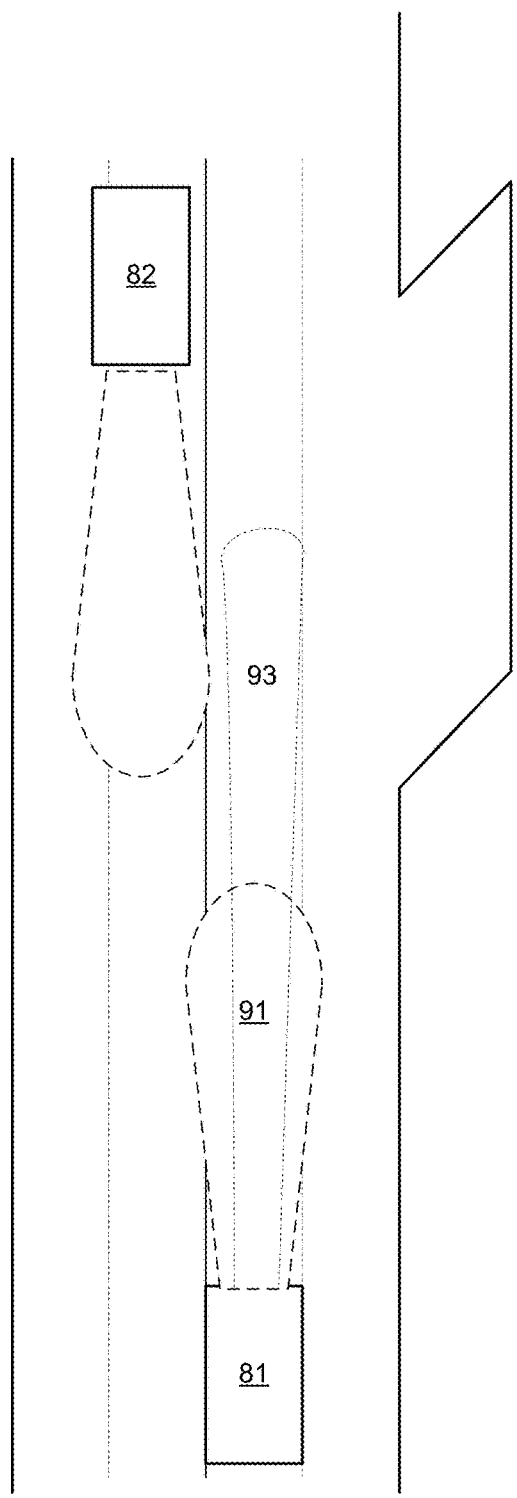
FIG. 5 is an example of a scenario.

FIG. 5 illustrates vehicle 81 and other vehicle 82 that are driving towards each other along linear road segment 30—which forms a headlight adjustable event that be identified by both the night vision sensor and the visible light sensor. Vehicle 81 may determine to adjust the current lighting pattern immediately to an amended lighting pattern 93. It should be noted that if the other vehicle 82 can not be seen by the visible light sensor (for example—the other vehicle does not turn on his lights+the environment is dark and not illuminated) then the other vehicle may not be detected by the visible light sensor—but rather only by the night-vision sensor.

Figure 6:
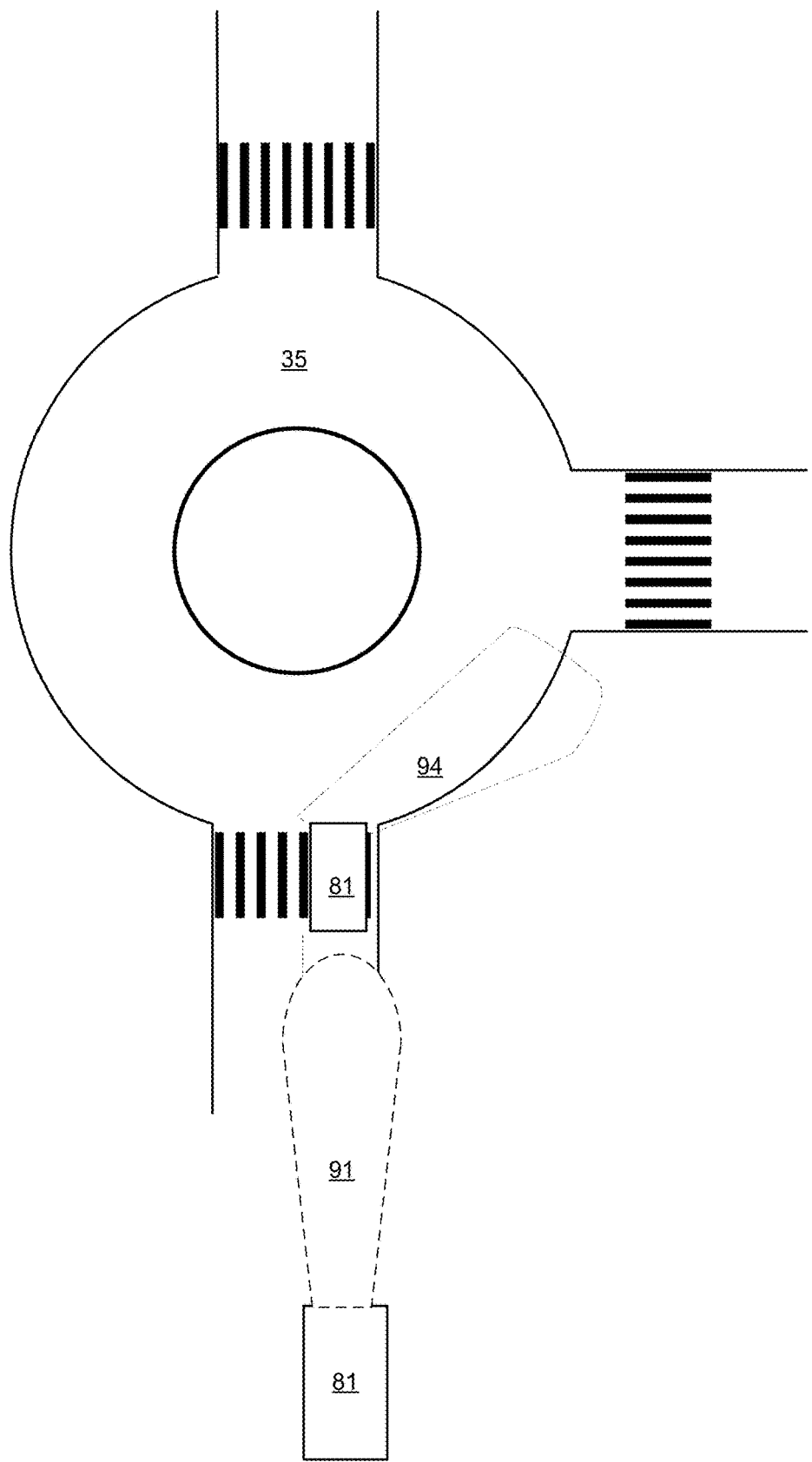
FIG. 6 is an example of a scenario.

FIG. 6 illustrates vehicle 81 that drives over a straight road segment while applying a first lighting pattern 91. Vehicle 81 detects a roundabout 35 well before reaching the roundabout and determines to adjust the current lighting pattern to an amended lighting pattern 94 either before reaching the roundabout (for example few meters or few centimeters in advance) or immediately when entering the roundabout—and applies the adjustment accordingly. Vehicle 81 may switch back to first lighting pattern either before exiting the roundabout or immediately when exiting the roundabout.

Figure 7:
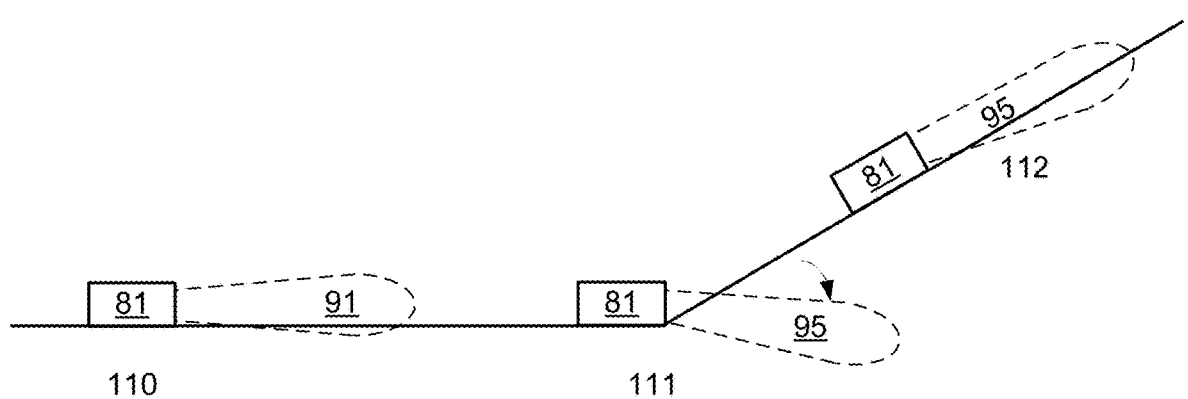
FIG. 7 is an example of a scenario.

FIG. 7 illustrates vehicle 81 that drives over a straight road segment 110 while applying a first lighting pattern 91. Vehicle 81 detects a hill 112 that starts at point 112 well before reaching the hill and determines to adjust the current lighting pattern to an amended lighting pattern 95 that is lower that first lighting pattern 91—either before reaching the hill (for example few meters or few centimeters in advance) or immediately when reaching the hill—and applies the adjustment accordingly. Vehicle 81 may switch back to first lighting pattern either before the hill ends of immediately when the hill ends.

Figure 8:
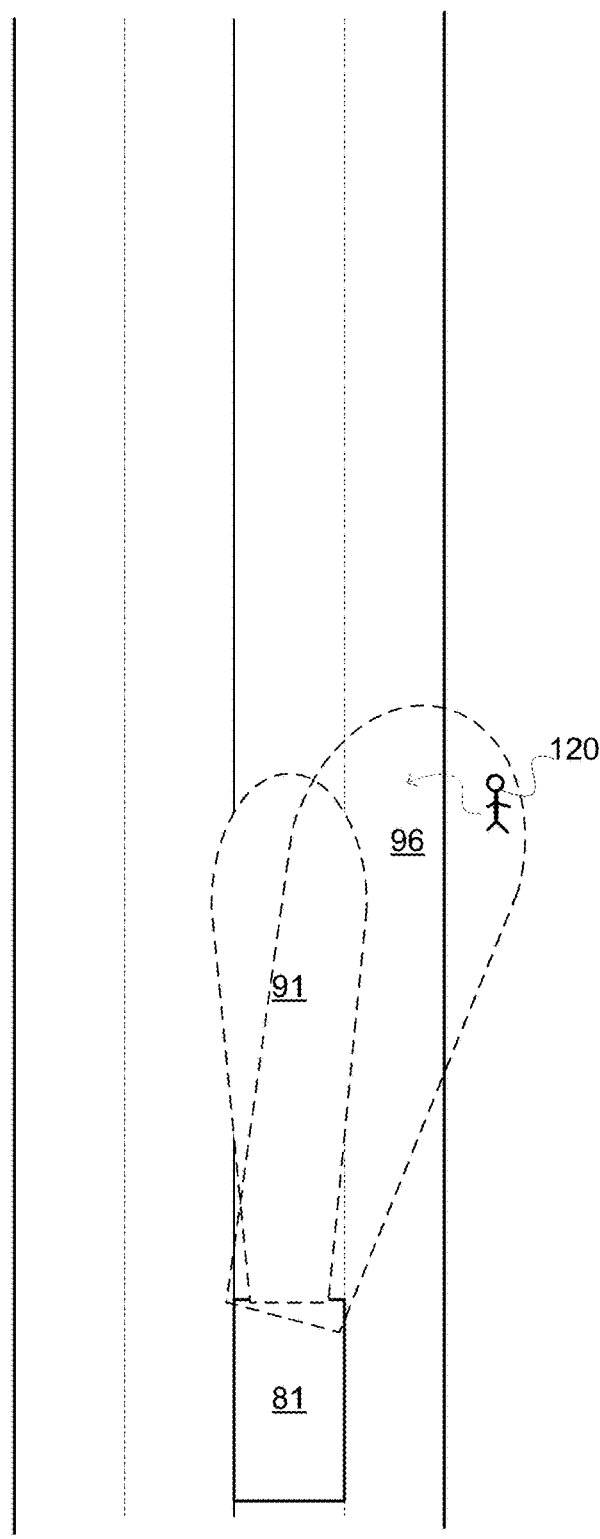
FIG. 8 is an example of a scenario.

FIG. 8 illustrates vehicle 81 that drives over a straight road segment while applying a first lighting pattern 91. Vehicle 81 (especially night-vision sensor) detects a person 120 that is about the cross the road and adjusts the current lighting pattern to an amended lighting pattern 96 that illuminates the person.

Figure 9:
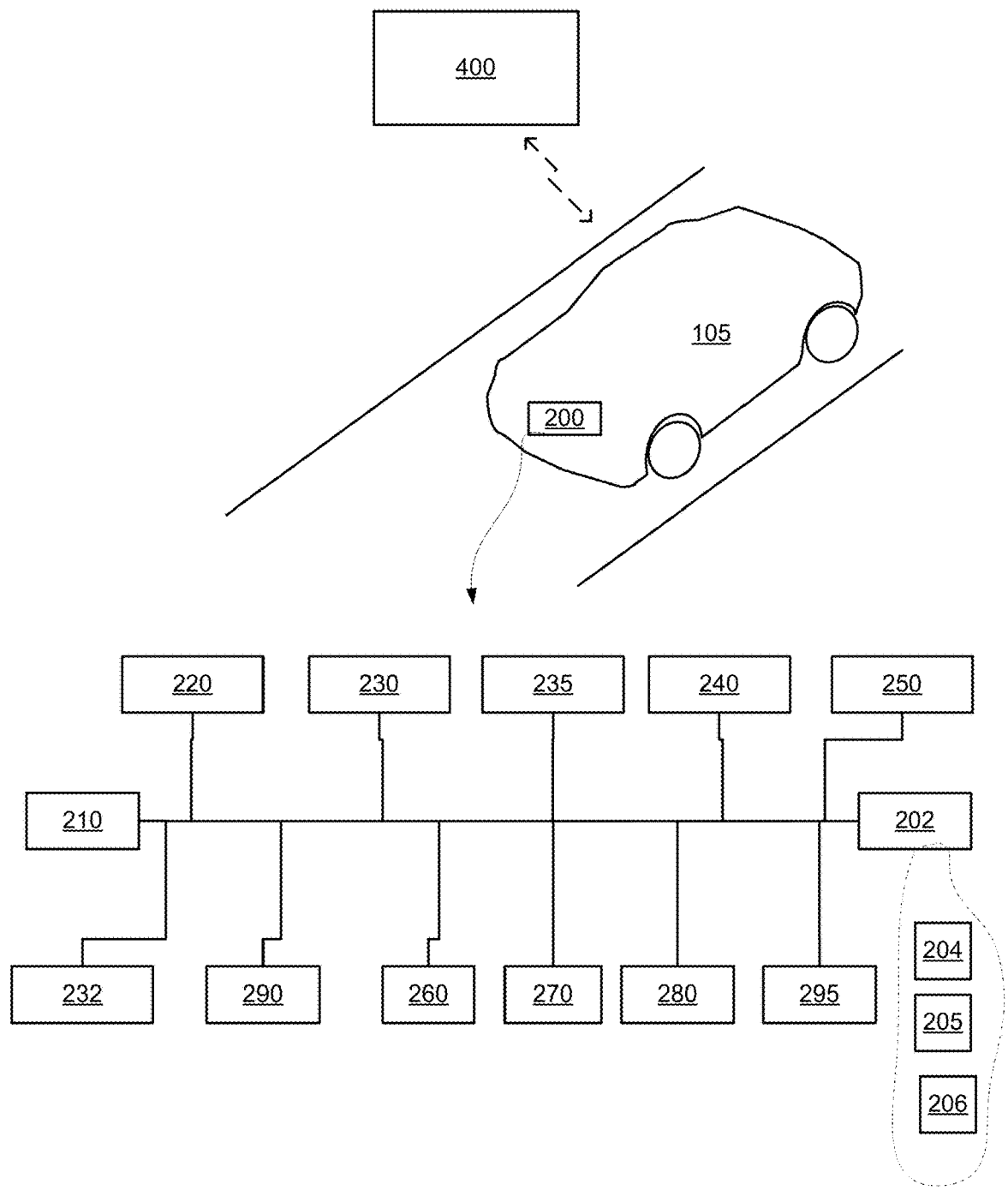
FIG. 9 is an example of a vehicle and its environment.

FIG. 9 illustrates a vehicle 105 that includes a driving system 200 (hereinafter also referred to as system 200), constructed and implemented in accordance with embodiments described herein. Driving system 200 may include adjustable headlights module 202, processing circuitry 210, input/output (I/O) module 220, night-vision sensor 230, visible light sensor 232, speed sensor 235, telemetry ECU 240, accelerometer 250, autonomous driving manager 260, database 270, advance driving assistance (ADAS) manager 280, headlight adjustable event metadata generator 290, and headlight adjustable event identification module 295.

The adjustable headlights module 202 may include adjustable headlights 204, mechanics 205 (for example motors, gears) for mechanically moving the adjustable headlights, and adjustment headlight controller 206. Any other optical and/or electrical component for adjusting the lighting pattern of the adjustable headlights may be provided. For example, the adjustment may include activating one headlight and deactivating another headlight.

The database 270 may store headlight adjustable event metadata such as (a) headlight adjustable event identifiers, and (b) comprising receiving or generating a mapping between different headlight adjustment event identifiers and lighting patterns associated with the different headlight adjustment events. The mapping may include any form of instructions, tables, pseudo-code and the like that links an identified headlight adjustment event to the required adjustment of the lighting pattern.

It should be noted that the vehicle may include (a) other systems or modules or units and/or (b) additional systems or modules or units, (c) and/or fewer systems or modules or units. For example—vehicle 105 may include only one out of autonomous driving manager 260 and ADAS manager 280.

Autonomous driving manager 260 may be instantiated in a suitable memory for storing software such as, for example, an optical storage medium, a magnetic storage medium, an electronic storage medium, and/or a combination thereof. It will be appreciated that system 200 may be implemented as an integrated component of an onboard computer system in a vehicle. Alternatively, system 200 may be implemented and a separate component in communication with the onboard computer system. It will also be appreciated that in the interests of clarity, while system 200 may comprise additional components and/or functionality e.g., for autonomous driving of vehicle 105, such additional components and/or functionality are not depicted in FIG. 9 and/or described herein.

Processing circuitry 210 may be operative to execute instructions stored in memory (not shown). For example, processing circuitry 210 may be operative to execute autonomous driving manager 260 and/or may be operative to execute headlight adjustment event metadata generator 290 and/or may be operative to execute ADAS manager 280 and/or may operable to execute the controller of the adjustable headlights module 202 and/or may be operable to execute the headlight adjustable event identification module 295.

It will be appreciated that processing circuitry 210 may be implemented as a central processing unit (CPU), and/or one or more other integrated circuits such as application-specific integrated circuits (ASICs), field programmable gate arrays (FPGAs), full-custom integrated circuits, etc., or a combination of such integrated circuits. It will similarly be appreciated that system 200 may comprise more than one instance of processing circuitry 210. For example, one such instance of processing circuitry 210 may be a special purpose processor operative to execute autonomous driving manager 260 to perform some, or all, of the functionality of system 200 as described herein.

I/O module 220 may be any suitable communications component such as a network interface card, universal serial bus (USB) port, disk reader, modem or transceiver that may be operative to use protocols such as are known in the art to communicate either directly, or indirectly, with other elements, such as, for example, system 400, night-vision sensor 230, visible light sensor 232, speed sensor 235, telemetry ECU 240, and/or accelerometer 250. As such, I/O module 220 may be operative to use a wired or wireless connection to connect to system 400 via a communications network such as a local area network, a backbone network and/or the Internet, etc. I/O module 220 may also be operative to use a wired or wireless connection to connect to other components of system 200, e.g., night-vision sensor 230, telemetry ECU 240, any other sensor, and/or accelerometer 250, adjustable headlights module 202, and the like. It will be appreciated that in operation I/O module 220 may be implemented as a multiplicity of modules, where different modules may be operative to use different communication technologies. For example, a module providing mobile network connectivity may be used to connect to system 400, whereas a local area wired connection may be used to connect to night-vision sensor 230, visible light sensor 232, telemetry ECU 240, and/or accelerometer 250.

In accordance with embodiments described herein, night-vision sensor 230, telemetry ECU 240, speed sensor 235, visible light sensor 232, and accelerometer 250 represent implementations of sensor(s). It will be appreciated that night-vision sensor 230, telemetry ECU 240, visible light sensor 232, and/or accelerometer 250 may be implemented as integrated components of vehicle 105 and may provide other functionality that is the interests of clarity is not explicitly described herein. As described hereinbelow, system 200 may use information about a current driving environment as received from night-vision sensor 230, visible light sensor 232, telemetry ECU 240, and/or accelerometer 250 to determine an appropriate driving policy for vehicle 105.

Autonomous driving manager 260 may be an application implemented in hardware, firmware, or software that may be executed by processing circuitry 210 to provide driving instructions to vehicle 105. For example, autonomous driving manager 260 may use images received from night-vision sensor 230, and/or from visible light sensor 232, and/or telemetry data received from telemetry ECU 240 to determine an appropriate driving policy for arriving at a given destination and provide driving instructions to vehicle 105 accordingly. It will be appreciated that autonomous driving manager 260 may also be operative to use other data sources when determining a driving policy, e.g., maps of potential routes, traffic congestion reports, etc. The autonomous driving manager 260 may use headlight adjustable event identifiers stored in database 270 to search for the future occurrence of headlight adjustment events. The autonomous driving manager 260 may use the mapping to determine how to adjust the lighting pattern—when detecting a future occurrence of an identified headlight adjustment event.

ADAS manager 280 may be an application implemented in hardware, firmware, or software that may be executed by processing circuitry 210 to assist a driver in driving the vehicle 105. The ADAS manager may assist the driver in any manner known in the art—for example—plan a suggested driving path, provide collision alerts, obstacle alerts, cross lane alerts, and the like. The ADAS manager 280 may provide indication to a driver (either upon request or else) that the headlights should be adjusted—before the occurrence of the headlight adjustment event—and ask the human driver to approve the adjustment from the adjustable vehicle module. The ADAS manager 280 may use the mapping to determine how to adjust the lighting pattern—when detecting a future occurrence of an identified headlight adjustment event.

For example—the mapping may be a representation of use cases and the expected adjustments—such as but not limited to
- if car in front identified closer than x meters—reduce high lights.
- if an "dangerous" object (such as animal, tire) identified in the shoulders of the road—point the light there.
- if a shoulder bending identified—the lights should track the curve of the line.

Headlight adjustment event identifier 290 may receive information from one or more sensors (for example from night-vision sensor 230, visible light sensor 232) and search for headlight adjustable event identifiers.

Figure 10:
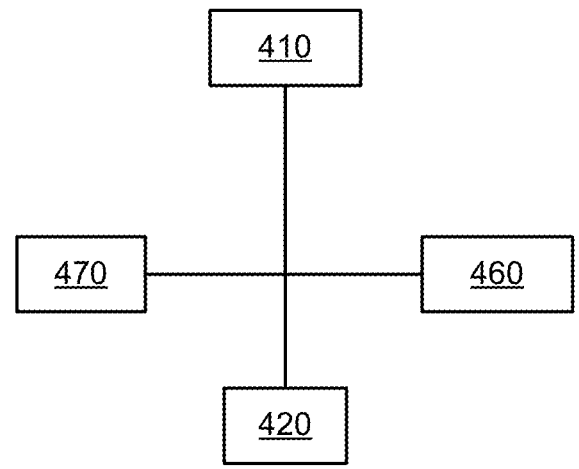
FIG. 10 is an example of a system.

Reference is now made to FIG. 10 which is a block diagram of an exemplary system 400 (such as a server, multiple servers), constructed and implemented in accordance with embodiments described herein. System 400 comprises processing circuitry 410, input/output (I/O) module 420, headlight adjustable event identifier 460, and database 470.

Headlight adjustable event metadata generator 460 may be instantiated in a suitable memory for storing software such as, for example, an optical storage medium, a magnetic storage medium, an electronic storage medium, and/or a combination thereof.

Processing circuitry 410 may be operative to execute instructions stored in memory (not shown). For example, processing circuitry 410 may be operative to execute headlight adjustable event metadata generator 460. It will be appreciated that processing circuitry 410 may be implemented as a central processing unit (CPU), and/or one or more other integrated circuits such as application-specific integrated circuits (ASICs), field programmable gate arrays (FPGAs), full-custom integrated circuits, etc., or a combination of such integrated circuits. It will similarly be appreciated that server 400 may comprise more than one instance of processing circuitry 410. For example, one such instance of processing circuitry 410 may be a special purpose processor operative to execute headlight adjustable event metadata generator 460 to perform some, or all, of the functionality of server 400 as described herein.

I/O module 420 may be any suitable communications component such as a network interface card, universal serial bus (USB) port, disk reader, modem or transceiver that may be operative to use protocols such as are known in the art to communicate either directly, or indirectly, with system 200 (FIG. 9). As such, I/O module 420 may be operative to use a wired or wireless connection to connect to system 200 via a communications network such as a local area network, a backbone network and/or the Internet, etc. It will be appreciated that in operation I/O module 420 may be implemented as a multiplicity of modules, where different modules may be operative to use different communication technologies. For example, a module providing mobile network connectivity may be used to connect wirelessly to one instance of system 200, e.g., one vehicle 105, whereas a local area wired connection may be used to connect to a different instance of system 100, e.g., a different vehicle 105.

Headlight adjustable event metadata generator 460 may be an application implemented in hardware, firmware, or software that may be executed by processing circuitry 410 to generate Headlight adjustable event metadata. For example, headlight adjustable event metadata generator 460 may use any sensed information from any sensor of any vehicle to determine headlight adjustable event identifier and/or may also determine, based on information sensed during, before or after the occurrence of a headlight adjustment event whether the current respond (the applied adjusted lighting pattern) is appropriate (if for example it properly captures the field of interest)—or should be modified.

It will be appreciated that headlight adjustable event metadata generator 460 may also be operative to use other data sources.

The terms "including", "comprising", "having", "consisting" and "consisting essentially of" are used in an interchangeable manner. For example—any method may include at least the steps included in the figures and/or in the specification, only the steps included in the figures and/or the specification. The same applies to the system.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

In the foregoing specification, the invention has been described with reference to specific examples of embodiments of the invention. It will, however, be evident that various modifications and changes may be made therein without departing from the broader spirit and scope of the invention as set forth in the appended claims.

Moreover, the terms "front," "back," "top," "bottom," "over," "under" and the like in the description and in the claims, if any, are used for descriptive purposes and not necessarily for describing permanent relative positions. It is understood that the terms so used are interchangeable under appropriate circumstances such that the embodiments of the invention described herein are, for example, capable of operation in other orientations than those illustrated or otherwise described herein.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures can be implemented which achieve the same functionality.

Any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, in one embodiment, the illustrated examples may be implemented as circuitry located on a single integrated circuit or within a same device. Alternatively, the examples may be implemented as any number of separate integrated circuits or separate devices interconnected with each other in a suitable manner.

Also for example, the examples, or portions thereof, may implemented as soft or code representations of physical circuitry or of logical representations convertible into physical circuitry, such as in a hardware description language of any appropriate type.

Also, the invention is not limited to physical devices or units implemented in non-programmable hardware but can also be applied in programmable devices or units able to perform the desired device functions by operating in accordance with suitable program code, such as mainframes, minicomputers, servers, workstations, personal computers, notepads, personal digital assistants, electronic games, automotive and other embedded systems, cell phones and various other wireless devices, commonly denoted in this application as 'computer systems'.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one as or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements the mere fact that certain measures are recited in mutually different claims does not indicate that a combination of these measures cannot be used to advantage.

Any system, apparatus or device referred to this patent application includes at least one hardware component.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

Any combination of any component of any component and/or unit of system or module that is illustrated in any of the figures and/or specification and/or the claims may be provided.

Any combination of any system or module illustrated in any of the figures and/or specification and/or the claims may be provided.

Any combination of steps, operations and/or methods illustrated in any of the figures and/or specification and/or the claims may be provided.

Any combination of operations illustrated in any of the figures and/or specification and/or the claims may be provided.

Any combination of methods illustrated in any of the figures and/or specification and/or the claims may be provided.

What is claimed is:

1. A method for operating adjustable headlights of a vehicle, the method comprising:
   obtaining location information related to a location of an expected headlight adjustment event (HAE);
   sensing, by a vehicle night-vision sensor, an environment of the vehicle to provide sensed information;
   searching, in the sensed information, for a HAE identifier, the HAE identifier identifies a future occurrence of a HAE, the HAE requires an adjustment of a lighting pattern formed by at least one of the adjustable highlights of the vehicle; and
   when finding a HAE identifier that is indicative of the future occurence of the HAE at the location of the expected HAE then:
   (a) veryfying the future occurence of the HAE; and
   (b) adjusting the lighting pattern according to the HAE, wherein the adjusting begins before the future occurrence of the HAE or immediately at a beginning of the HAE; and
   triggering a check of the vehicle night-vision sensor when not finding the HAE identifier indicative of the future occurence of the HAE at the location of the expected HAE.

2. The method according to claim 1, comprising
   sensing, by a visible light sensor, the environment of the vehicle to provide additional sensed information;
   searching, in the sensed information and in the additional sensed information, for the headlight adjustment event identifier; and
   adjusting the lighting pattern according to the HAE when finding the HAE identifier in the sensed information and in the additional sensed information.

3. The method according to claim 1, comprising receiving or generating a mapping between different HAE identifiers and lighting patterns associated with different headlight adjustment events.

4. The method according to claim 1, wherein the HAE is a curve and wherein the HAE identifier is a traffic sign indicative of the curve.

5. The method according to claim 1, comprising verifying the occurence of the HAE as indicated by the sensed information, using the additional sensed information.

6. The method according to claim 1, wherein the HAE is an entity that is expected to cross a path of the vehicle.

7. The method according to claim 2, comprising:
   adjusting the lighting pattern according to the HAE when (a) finding the HAE identifier in the sensed information but not in the additional sensed information and (b) when the HAE identifier is not expected to be found in the additional sensed information.

8. The method according to claim 1 comprising verifying the occurence of the HAE using a non-visual sensor.

9. The method according to claim 1, wherein the vehicle night-vision sensor is a radar.

10. The method according to claim 1, wherein the vehicle night-vision sensor is a LIDAR.

11. The method according to claim 1, wherein the vehicle night-vision sensor is an infrared sensor.

12. The method of claim 1 comprising operating the vehicle night vision sensor non-continuously and under a control of an autonomous driving system of the vehicle.

13. A non-transitory computer readable medium for operating adjustable headlights of a vehicle, the non-transitory computer readable medium that stores instructions for:
   obtaining location information related to a location of an expected headlight adjustment event (HAE);
   sensing, by a vehicle night-vision sensor, an environment of the vehicle to provide sensed information;
   searching, in the sensed information, for a HAE, the HAE identifier identifies a future occurrence of a HAE the HAE requires an adjustment of a lighting pattern formed by at least one of the adjustable highlights of the vehicle; and
   when finding the HAE identifier that is indicative of the future occurence of the HAE at the location of the expected HAE then:
   (a) veryfying the future occurence of the HAE; and
   (b) adjusting the lighting pattern according to the HAE, wherein the adjusting begins before the future occurrence of the HAE or immediately at a beginning of the headlight adjustment event; and
   triggering a check of the vehicle night-vision sensor when not finding the HAE identifier indicative of the future occurence of the HAE at the location of the expected HAE.

14. The non-transitory computer readable medium according to claim 13, that stores instructions for
   sensing, by a visible light sensor, the environment of the vehicle to provide additional sensed information; and
   adjusting the lighting pattern according to the HAE when finding the HAE identifier in the sensed information but not finding the not in the additional sensed information and (b) when the HAE identifier is not expected to be found in the additional sensed information.

15. The non-transitory computer readable medium according to claim 14, that stores instructions for receiving or generating a mapping between different HAE identifiers and lighting patterns associated with different headlight adjustment events.

16. The non-transitory computer readable medium according to claim 13, wherein the HAE is a curve and wherein the HAE identifier is a traffic sign indicative of the curve.

17. The non-transitory computer readable medium according to claim 13, wherein the HAE is a change in an inclination of the road.

18. The non-transitory computer readable medium according to claim 13, wherein the HAE is an entity that is expected to cross a path of the vehicle.

19. The non-transitory computer readable medium according to claim 13, that stores instructions for:
sensing, by a visible light sensor, the environment of the vehicle to provide additional sensed information;
searching, in the sensed information and in the additional sensed information, for the headlight adjustment event (HAE) identifier; and
adjusting the lighting pattern according to the HAE when finding the HAE identifier in the sensed information and in the additional sensed information.

20. The non-transitory computer readable medium according to claim 19, wherein the adjusting of the lighting pattern is also based on information sensed by another sensor of the vehicle.

21. The non-transitory computer readable medium according to claim 18 that stores instructions for sensing, by a visible light sensor, the environment of the vehicle to provide additional sensed information; searching, in the sensed information and in the additional sensed information, for the HAE identifier; and verifying the occurence of the HAE, as indicated by the sensed information, using the additional sensed information.

22. The non-transitory computer readable of claim 19 wherein the adjusting begins before the future occurrence of the headlight adjustment event.

* * * * *